United States Patent
Nilsson (10) Patent No.: US 9,661,327 B2
(45) Date of Patent: May 23, 2017

(54) ENCODING VIDEO CAPTURED IN LOW LIGHT

(71) Applicant: Microsoft Technology Licensing, LLC, Redmond, WA (US)

(72) Inventor: Mattias Nilsson, Sundyberg (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 491 days.

(21) Appl. No.: 14/092,426

(22) Filed: Nov. 27, 2013

(65) Prior Publication Data

US 2015/0043655 A1 Feb. 12, 2015

(30) Foreign Application Priority Data

Aug. 6, 2013 (GB) .................................. 1314068.6

(51) Int. Cl.
*H04N 1/58* (2006.01)
*H04N 19/85* (2014.01)
(Continued)

(52) U.S. Cl.
CPC ... *H04N 19/00903* (2013.01); *G06K 9/00691* (2013.01); *G06K 9/00718* (2013.01);
(Continued)

(58) Field of Classification Search
CPC ........ H04N 1/58; H04N 1/6005; H04N 5/217; H04N 5/357
See application file for complete search history.

(56) References Cited

U.S. PATENT DOCUMENTS 4,573,070 A * 2/1986 Cooper ................... H04N 5/21
348/610
5,909,249 A * 6/1999 Sathe ..................... H04N 19/86
348/25
(Continued)

FOREIGN PATENT DOCUMENTS

EP 1553778 7/2005
WO WO-03077549 9/2003
(Continued)

OTHER PUBLICATIONS

"International Preliminary Report on Patentability", Application No. PCT/US2014/049517, Oct. 12, 2015, 10 pages.
(Continued)

*Primary Examiner* — Robert Hance (57) ABSTRACT

Apparatus comprising an encoder configured to encode a video signal captured from a camera, and a low-light enhancement module configured to apply a low-light enhancement to the video signal. The low-light enhancement is performed in a color space comprising two color channels representing color, and an achromatic channel representing light level. The enhancement comprises: detecting at least a first classification indicative of disturbance in the video signal due to capture in low light; and in response to detecting this classification, applying a low-light processing operation to at least one of the color channels to reduce a number of bits incurred by color in the encoding, such that an increased number of bits is spent on the achromatic channel when encoded by the encoder.

20 Claims, 3 Drawing Sheets

(51) Int. Cl.

| | |
|---|---|
| H04N 1/60 | (2006.01) |
| H04N 5/217 | (2011.01) |
| H04N 5/357 | (2011.01) |
| H04N 5/91 | (2006.01) |
| G06T 5/00 | (2006.01) |
| H04N 19/117 | (2014.01) |
| H04N 19/124 | (2014.01) |
| H04N 19/136 | (2014.01) |
| H04N 19/17 | (2014.01) |
| H04N 19/86 | (2014.01) |
| H04N 9/64 | (2006.01) |
| G06K 9/00 | (2006.01) |
| G06K 9/40 | (2006.01) |
| H04N 9/73 | (2006.01) |
| H04N 9/77 | (2006.01) |

(52) U.S. Cl.
CPC ........... *G06K 9/00744* (2013.01); *G06K 9/40* (2013.01); *G06T 5/002* (2013.01); *G06T 5/009* (2013.01); *H04N 1/58* (2013.01); *H04N 1/6005* (2013.01); *H04N 5/217* (2013.01); *H04N 5/357* (2013.01); *H04N 5/91* (2013.01); *H04N 9/646* (2013.01); *H04N 9/73* (2013.01); *H04N 9/77* (2013.01); *H04N 19/117* (2014.11); *H04N 19/124* (2014.11); *H04N 19/136* (2014.11); *H04N 19/17* (2014.11); *H04N 19/86* (2014.11); *G06T 2207/10016* (2013.01); *G06T 2207/10024* (2013.01)

(56) References Cited

U.S. PATENT DOCUMENTS

| | | | |
|---|---|---|---|
| 9,317,930 B2* | 4/2016 | Kuo | ........................ G06T 7/408 |
| 2002/0118883 A1 | 8/2002 | Bhatt | |
| 2005/0100229 A1* | 5/2005 | Becker | ................ H04N 19/176 |
| | | | 382/232 |
| 2008/0144958 A1 | 6/2008 | Lee | |
| 2008/0317377 A1* | 12/2008 | Saigo | ..................... H04N 9/045 |
| | | | 382/274 |
| 2012/0212653 A1 | 8/2012 | Kanemitsu et al. | |
| 2013/0064448 A1 | 3/2013 | Tomaselli et al. | |
| 2013/0235072 A1* | 9/2013 | Longhurst | ................ H04N 1/46 |
| | | | 345/605 |
| 2013/0321700 A1* | 12/2013 | Cote | ..................... H04N 5/213 |
| | | | 348/453 |

FOREIGN PATENT DOCUMENTS

| | | |
|---|---|---|
| WO | WO-2012068085 | 5/2012 |
| WO | WO-2013025220 | 2/2013 |

OTHER PUBLICATIONS

"International Search Report and Written Opinion", Application No. PCT/US2014/049517, Feb. 4, 2015, 15 Pages.

Adelson, "Pyramid Methods in Image Processing", Retrieved from: <http://web.mit.edu/persci/people/adelson/pub_pdfs/RCA84.pdf> on Apr. 23, 2008, Nov. 1984, 9 Pages.

Chatterjee, et al., "Noise Suppression in Low-light Images through Joint Denoising and Demosaicing", IEEE Conference on Computer Vision and Pattern Recognition, Jun. 20, 2011, 8 Pages.

Duda, et al., "Pattern Classification", Linear Discrimination Functions Chapter 5, 2001, 5 Pages.

Gupta, et al., "Data and Rate Adaptive Quantization for Joint Image Denoising and Compression", 37th Asilomar Conference on Signals, Systems, and Computers, vol. 2,, Nov. 9, 2003.

Shao, et al., "Quality Adaptive Least Squares Trained Filters for Video Compression Artifacts Removal Using a No-Reference Block Visibility Metric", Jan. 1, 2011, 25 pages.

"Second Written Opinion", Application No. PCT/US2014/049517, Jun. 29, 2015, 6 pages.

\* cited by examiner

ENCODING VIDEO CAPTURED IN LOW LIGHT

RELATED APPLICATION

This application claims priority under 35 USC 119 or 365 to Great Britain Application No. 1314068.6 filed Aug. 6, 2013, the disclosure of which is incorporate in its entirety.

BACKGROUND

In modern communications systems a video signal may be sent from one terminal to another over a medium such as a wired and/or wireless network, often a packet-based network such as the Internet. In many situations it is desired to encode and transmit the video in real time, i.e. video of some event or stream of content continues to be encoded in an ongoing fashion while preceding, previously encoded video data of that same event or stream of content is transmitted (as opposed to a whole video file being encoded in one go and then subsequently transmitted). Hence one frame of the video may be encoded while one of the immediately preceding, already-encoded frames is transmitted (or buffered for transmission), and so forth. Put another way, the video is transmitted "as and when" it is encoded. "Real-time" as used herein does not necessarily limit to zero delay. Nonetheless, the user does expect the video to be encoded, transmitted and decoded at least as quickly as the event being captured actually occurs, and at least as quickly as the video is intended to play out (on average over several frames). An example of real-time video communication would be a live video call or other live transmission, where the video is also captured in real-time as it is encoded and transmitted.

The frames of the video are encoded by the encoder at the transmitting terminal in order to compress them for transmission over the network or other medium. Compression is particularly relevant for real-time video communication, although other reasons to compress a video signal also include reducing the size of a video file for upload, download or storage on a storage medium.

The encoding commonly comprises prediction coding in the form of intra-frame prediction coding, inter-frame prediction coding, or more usually a combination of the two (e.g. a few intra-frame encoded "key" frames interleaved between sequences of inter-frame encoded frames). According to intra-frame encoding, blocks are encoded relative to other blocks in the same frame. In this case a target block is encoded in terms of a difference (the residual) between that block and another block in the same frame, e.g. a neighbouring block. The residual is smaller than an absolute value and so requires fewer bits to encode, and the smaller the residual the fewer bits are incurred in the encoding. According to inter-frame encoding, blocks in the target frame are encoded relative to corresponding portions in a preceding frame, typically based on motion prediction. In this case a target block is encoded in terms of a motion vector identifying an offset between the block and the corresponding portion from which it is to be predicted, and a difference (the residual) between the block and the corresponding portion from which it is predicted. Inter-frame encoding usually results in an even smaller residual than intra-frame encoding, and hence incurs even fewer bits.

A corresponding decoder at the receiver decodes the frames of the received video signal based on the appropriate type of prediction, in order to decompress them for output to a screen. A generic term that may be used to refer to an encoder and/or decoder is a codec.

A frame may be captured by the camera on the encoding side in a colour space based on a three-colour model such as RGB (Red, Green, Blue). This means each pixel is represented in terms of an intensity of a red (R) channel, an intensity of a green (G) channel and an intensity of a blue (B) channel. However, it is also possible to consider a pixel in terms of only two colour channels, which may be referred to as chrominance or chroma channels, and one achromatic channel representing overall light level of the pixel, e.g. in terms of brightness or lightness. For example the two chrominance channels may be red and blue channels. The achromatic channel may be referred to as the luminance or luma channel. In some contexts the term luminance is used specifically to refer to a non gamma corrected level whilst luma is used to refer to a gamma corrected level. However, in this disclosure luminance may be used as a general term for a gamma corrected or uncorrected level. Chroma and chrominance may also be used interchangeably with one another. An example of such a colour space is YUV where Y refers to the luminance channel, U the blue chrominance channel and V the red chrominance channel. Other similar colour space models will be familiar to a person skilled in the art. For example in HSV the colour channels are hue (H) and saturation (S) and the achromatic light-level channel is brightness value (V). In HSL the colour channels are hue (H) and saturation (S) and the achromatic light-level channel is lightness (L).

Prior to encoding, a frame is often explicitly transformed into a luminance-chrominance type colour-space representation (as well as being transformed from a spatial domain representation in terms of pixel coordinates into a spatial frequency domain representation in terms of a set of frequency coefficients, and being quantized). Alternatively it is not precluded that the video could be captured in YUV space, or converted to YUV or the like having been captured in some other colour space than RGB. Even if not explicitly captured or encoded in YUV type space, it is still possible to describe or consider an image in an alternative colour space such as YUV.

SUMMARY

There are various factors which may be considered relevant to the performance of a video codec. For example, one factor is the number of bits incurred in the encoded signal, while another is the quality of the encoded video. One thing that can affect such factors is the level of light in the camera's surroundings—i.e. the level of light in the environment where the video is captured, and hence the amount of light reflected from the scene being captured and in turn the amount of light with which the image capture element of the camera is illuminated when capturing each frame of the video. For example, one possible effect is that low light levels can increase the amount of noise in the captured video image and/or introduce other unnatural artefacts, particularly in one or both of the colour channels. For instance in many low-light situations, artefacts are observed to appear in the form of colour patches or "splotches", and/or unnatural colour tones around facial features. As well as reducing quality, such noise and/or other artefacts can sometimes also introduce greater differences across a frame and/or between frames, meaning a larger residual and therefore more bits being incurred in the encoding.

According to one aspect disclosed herein, there is provided an apparatus comprising an encoder configured to encode a video signal captured from a camera, and a low-light enhancement module configured to apply a low light enhancement to the captured video signal. The low-light enhancement is performed in a colour space comprising two colour channels and an achromatic channel (even if captured and/or encoded in a different colour space such as RGB). In embodiments the low-light enhancement module may be implemented in a pre-processing stage between the capture of the video signal and the encoder, such that the encoder encodes the video following the low-light enhancement.

The low-light enhancement comprises detecting at least a first classification indicative of disturbance such as noise and/or other artefacts occurring in the video signal due to capture in low light. In embodiments, this may be any suitable classification as to whether noise is determined to be present taking into account whether this noise is, or is likely to be, substantially a result of the video being captured in low-light conditions. For example in one embodiment the first classification is a soft classification representing a probability of the video signal containing noise due to low-light capture.

In response to detecting this classification, the low-light enhancement module applies a low-light processing operation to at least one of the colour channels, e.g. the blue channel, to reduce a number of bits incurred by colour when the video signal is encoded by the encoder. In embodiments this comprises performing a denoising filtering operation on the at least one colour channel, e.g. by box filtering. For example, the de-noising may be applied on condition of the probability exceeding a threshold, or may be varied by degrees as a function of the probability. The de-noising results in fewer differences within a frame or between frames, so giving a smaller residual on the colour channel(s) and thus taking up fewer bits in the encoding. This makes more bits available to spend on encoding the achromatic channel. For example if the encoder includes a bitrate controller which sets a certain bit budget for the encoded stream, then when the number of bits incurred on the colour channel(s) is decreased, this frees some bits of the budget to be spent elsewhere. The bitrate controller will then automatically allocate at least some of these bits to the achromatic channel (e.g. by increasing the quantization granularity on the achromatic channel).

In embodiments, the low-light enhancement may optionally further comprise detecting a second classification indicative of the video signal being captured in low light. This may be based on any suitable classification as to whether low light surroundings are, or are likely to be, substantially affecting the ability of the camera to capture images and/or the encoder to encode images to an extent that it is substantially responsible for causing disturbance or artefacts. For example in one embodiment the detection of the low light classification comprises determining a probability of the video signal being captured in what would be considered adversely low light.

In response to detecting the second, low-light classification, the low-light enhancement module may then apply a further low-light processing operation to boost the luminance channel. For example, the luminance boost may be applied on condition of the probability exceeding a threshold, or the boost may be varied by degrees as a function of the probability. Alternatively or additionally, the low-light enhancement module may apply a chrominance adjustment in response to detecting the second, low-light classification. For instance when a video call is conducted in low-light surroundings, the light emitted from the sender's own screen often accounts for a noticeable proportion of the light illuminating the sender's face. The light from the screen often has a cooler colour temperature than other light experienced in brighter surroundings, so this effect can lend an unnatural bluish tone to the captured video. To compensate for this or other such effects, the chrominance adjustment may comprise augmenting the red channel and/or diminishing the blue channel, e.g. adding a small offset to the red channel and/or subtracting a small offset from the blue channel. Similarly to the luminance boost, the chrominance adjustment may for example be applied on condition of the probability exceeding a threshold, or may be varied by degrees as a function of the probability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To aid understanding of the present disclosure and to show how embodiments may be put into effect, reference is made by way of example to the accompanying drawings in which.

DETAILED DESCRIPTION OF EMBODIMENTS

Typical properties of video captured in low-light comprise noise, dark shadows, and/or unnatural colour tones. For example the noise due to low-light can manifest itself as chroma splotches in the video. Splotches, besides being visually unpleasant artefacts, can be expensive to encode (in terms of bitrate) leaving too few bits for the encoding of the wanted parts of the video.

Further, in video calls eye contact and facial expressions can provide significant information when communicating. Thus, dark video containing shadows in the facial region has a negative impact on the communication quality. The unnatural tone of the face in low-light is often due to the cool colour temperature of the light emitted from the display in front of the user at the transmitting side. Adjusting the tone will reduce the feeling that the person sits behind a computer when communicating.

The following embodiments may be used to alleviate one or more such issues by applying illuminance boosting, chroma adjustment, and/or denoising. When and to what degree to apply these processing algorithms can be controlled based on low-light and noise classifiers, details of which will be exemplified shortly.

Further, one challenge in implementing embodiments of the low-light enhancer is keeping the complexity low in order to facilitate real-time processing. Compared to prior solutions in this area that require extensive processing, the embodiments below are designed to reach a good trade-off in terms of effectiveness versus computational complexity.

Figure 1:
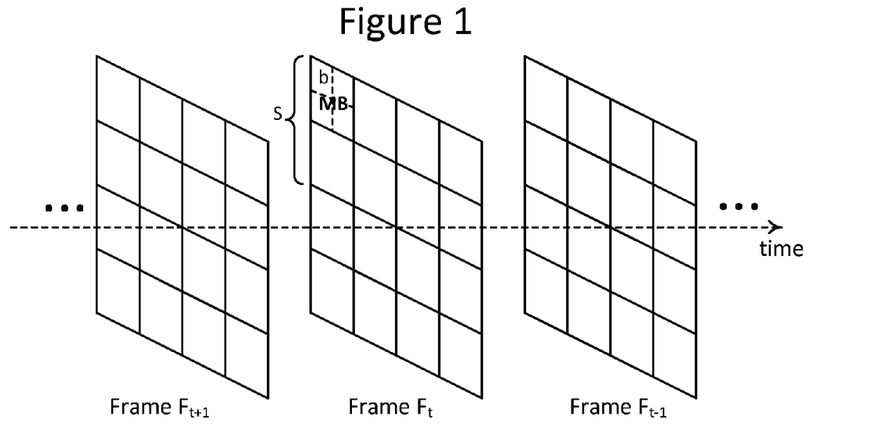
FIG. 1 is a schematic representation of a captured video signal.

FIG. 1 gives a schematic illustration of an input video signal captured from a camera, and divided into portions to be encoded by a video encoder so as to generate an encoded bitstream. The signal comprises a moving video image divided in time into a plurality of frames (F), each frame representing the image at a different respective moment in time ( . . . t−1, t, t+1 . . . ). Within each frame, the frame is divided in space into a plurality of portions each representing a plurality of pixels. The portions may for example be referred to as blocks. In certain schemes, the frame is divided and sub-divided into different levels of portion or block. For example each frame may be divided into macroblocks (MB) and each macroblock may be divided into blocks (b), e.g. each block representing a region of 8×8 pixels within a frame and each macroblock representing a region of 2×2 blocks (16×16 pixels). In certain schemes each frame can also be divided into parts called slices (S), each comprising a plurality of macroblocks.

Figure 2:
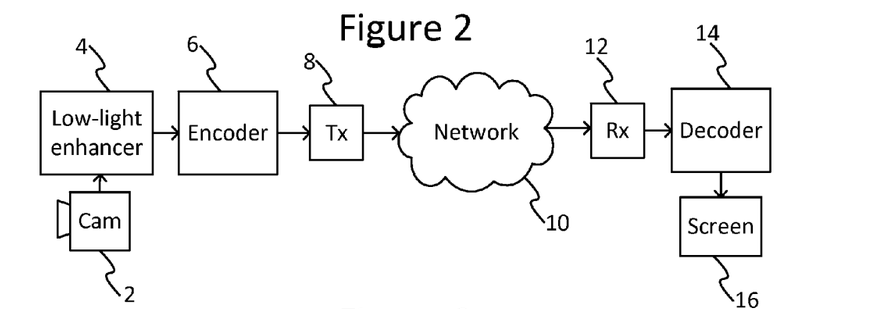
FIG. 2 is a schematic block diagram of a communication system.

FIG. 2 is a block diagram of a communication system for communicating a video signal in encoded (compressed) form. At the transmit side, the communication system comprises a video camera 2, a pre-processing module comprising a low-light enhancer 4 having an input coupled to an output of the camera, an encoder 6 having an input coupled to an output of the low-light enhancer 4, and a transmitter 8 having an input coupled to an output of the encoder 6. The camera 2 is configured to capture a video signal from its surroundings, i.e. to capture light from a moving scene in its surroundings and to generate a video signal representing this scene. The generated signal is divided into portions such as blocks, macroblocks and/or slices as illustrated in FIG. 1 (e.g. by an initial pre-processing stage, not shown) and output in such a form to the input of the low-light enhancer 4.

The low-light enhancer 4 is configured to pre-process the frames of the video signal to perform an enhancement in low light conditions, embodiments of which will be discussed shortly. The enhanced frames are output from the low-light enhancer 4 to the input of the encoder 6, where they are encoded following the pre-processing by the low-light enhancer 4. Note where it is said the encoder 6 encodes the data following the pre-processing by the low-light enhancer 4, this does not necessarily mean the whole video is pre-processed before encoding. Rather, as each frame or part of a frame is pre-processed by the low-light enhancer, the frame or part is then encoded while another, subsequent frame or part of the frame is pre-processed, and so forth.

The encoder 6 outputs the encoded video to the input of the transmitter 8. The transmitter 8 has an output coupled or operable to couple to a communication medium, for example comprising one or more networks 10 such as the Internet and/or other packet-based network. The transmitter may comprise a wired and/or wireless interface to the network 10, and the video may be transmitted via the wired and/or wireless interface. In the case of real-time transmission, as each frame or part of a frame is encoded by the encoder 6, the transmitter 8 then transmits the frame or part whilst the encoder 6 continues to encode another, subsequent frame or part of a frame, and so forth.

In embodiments, the transmitter 8, the encoder 6, and/or the pre-processing module comprising the low-light enhancer 4 may be implemented in the same terminal such as a user terminal; e.g. a mobile user terminal in the form of a smart phone, tablet, laptop computer or the like; or another type of user terminal like a desktop computer. The camera 2 may be internal or external to the terminal. The encoder 6, low-light enhancer 4 and/or any other pre-processing or post-processing stages may be implemented in the form of code stored on a computer-readable storage medium such as a magnetic and/or electronic storage medium, and arranged to be executed on a processor comprising one or more processing units; e.g. as part of a communication client application such as a VoIP client with video calling. Alternatively it is not excluded that some or all of the functionality of the encoder 6, low-light enhancer 4 and/or any other stages are implemented in the form of dedicated hardware circuitry, or configurable or reconfigurable hardware circuitry such as a programmable gate array (PGA) or field programmable gate array (FPGA). "Pre-processing" or "processing" in the present sense does not necessarily imply execution of software on a processor, though that is certainly one implementation.

At the receive side, the communication system comprises a receiver 12, a decoder 14 having an input coupled to an output of the receiver 12, and a screen 16 having an input coupled to an output of the decoder 14. The receiver 12 is coupled or operable to couple to the communication medium, e.g. the one or more networks 10, and thereby receive the encoded video transmitted from the encoder 6 via the transmitter 8 and that network 10 or other communication medium. The receiver 12 passes the received, encoded video signal to the decoder 14, which decodes the signal and outputs the decoded version of the signal to be played out through the screen 16.

In embodiments, the receiver 12 and decoder 14 may be implemented on the same terminal such as a user terminal, e.g. a mobile user terminal in the form of a smart phone, tablet, laptop computer or the like; or another type of user terminal like a desktop computer. The screen 16 may be internal or external to the terminal. The decoder 14 may be implemented in the form of code stored on a computer-readable storage medium such as a magnetic and/or electronic storage medium, and arranged to be executed on a processor comprising one or more processing units. Alternatively it is not excluded that some or all of the functionality of the decoder 14 may be implemented in the form of dedicated hardware circuitry, or configurable or reconfigurable hardware circuitry such as a PGA or FPGA.

Of course it will be appreciated that the "receive-side" terminal may also be configured to pre-process, encode and transmit video to be received, decoded and played out by the "transmit-side" terminal, but for the sake of illustration the disclosure is described in terms of a transmitting and receiving side as illustrated schematically in FIG. 2.

Figure 3:
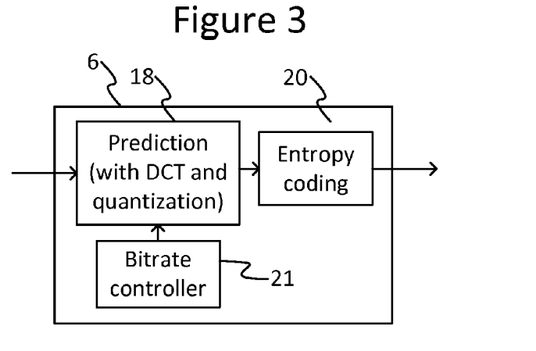
FIG. 3 is a schematic block diagram of an encoder.

FIG. 3 provides a schematic block diagram of the encoder 6. The encoder 6 comprises a prediction coding module 18 arranged to receive the pre-processed video signal as an input, and an entropy encoder 20 coupled to an output of the prediction coder 18. The prediction coder 18 encodes each frame of the input video signal using intra and/or inter frame encoding. The intra frame encoding is performed by predicting portions such as blocks or macroblocks of the frame relative to other blocks or macroblocks in the same frame, and the inter frame encoding is performed by predicting portions such as blocks or macroblocks in the frame relative to corresponding portions in one or more other frames. Other encoding modes may also be familiar to a person skilled in the art.

Either way, the result of this stage of the encoding is to produce a version of the signal in which each block or macroblock is represented in terms of residual samples (representing a difference between samples between different blocks or image portions) instead of absolute sample values. The residual values tend, on the whole, to be smaller in magnitude than the absolute values from which they were produced. The residual samples are output from the prediction coder 18 to the input of the entropy encoder 20 for further encoding. The action of an entropy encoder 20 is to encode frequently (commonly) occurring sample values with smaller bit-length codes, and to encode infrequently (rarely) occurring sample values with longer bit-length codes (rather than representing all possible sample values with a uniform number of bits). In the case of an encoder which aims to produce residual samples that are a small magnitude, the effect is that zero valued or small magnitude samples will be the most frequently occurring. Thus the encoder 6 operates so that smaller magnitude residual samples take fewer bits to encode in the encoded bitstream, and hence frames having smaller differences within the frame and/or between frames will incur a lower bitrate when encoded than frames with larger differences.

As will be familiar to a person skilled in the art, the prediction coding may optionally also involve a transform and/or a quantization. The transform stage transforms the residual samples of each block or macroblock of each frame from a spatial domain representation (each colour space channel being represented as a function of spatial coordinates of pixels) to a transform domain representation such as spatial frequency domain representation (each colour space channel being represented as a function of spatial frequency, in terms of frequency domain coefficients). For example the transform may comprise a discrete cosine transform (DCT) or a Karhunen-Loève transform (KLT). Following the transform of a block or macroblock, the quantizer then quantizes the transformed samples of the block or macroblock. Quantization refers to the process of taking samples represented on a relatively large scale or from amongst values of a relatively large set, and converting them to samples represented on a relatively small scale or from amongst a relatively small set (which may be referred to as the quantization levels). For instance quantization may refer to the process of converting an effectively continuous variable (e.g. a digital approximation of a continuous variable) into variable constrained to a set of substantially discrete levels. The transform and quantization enable spatial redundancy to be exploited, as in the transform domain many of the samples quantize to zero or at least to smaller values than they would in the spatial domain, therefore increasing the number of zero or small-magnitude values representing the samples and so further reducing the bitrate.

The encoder 6 may also comprise a bitrate controller 21 coupled to the prediction coding module 18. The bitrate controller 21 is configured to set a certain target bitrate or "bit budget" for the encoded bitstream, e.g. a target number of bits to be spent on encoding a given frame or part of a frame. This budget may be set based on the bandwidth available over the network 10, or the uplink bandwidth of the transmitter 8, or the processing resources of a processor on which the encoder 6 is being run, or any combination of such factors. The encoder 6 thus has a certain number of bits available to encode a given part of the video signal per unit time, e.g. a given frame or part of a frame. The bitrate controller 21 is configured to adapt one or more parameters of the encoding to try to meet the bitrate target as closely as possible (perhaps allowing some margin of error). For example the bitrate controller may adapt the quantization granularity and/or an encoding mode of the prediction coding loop. The aim is to spend as many bits as are allowed by the bitrate constraint so as to maximise quality, but without exceeding that constraint (which might otherwise for example cause other issues like delay or packet loss in the transmission over the network 10).

In embodiments, the encoder 6 may be a conventional encoder such as an encoder according to the H.264 standard, with the teachings of the present disclosure being implemented in a pre-processing module 4 arranged between the output of the camera 2 and the input of the encoder 6.

As discussed, video captured under low-light levels can tend to experience increased distortion, and disproportionately so on one or both of the chrominance channels relative to the luminance channel. For example the video may experience increased noise manifested as chroma splotches within a frame, which could be for example blue, purple, yellow or red in appearance. In many situations the blue channel has been observed to be the most noisy. As well as affecting the objective and/or perceived (subjective) quality of the video, such noise may mean that there are larger differences across the area of a given frame and/or between frames, resulting in unnecessary bits being incurred on the noisy chrominance channel. Alternatively or additionally, video captured in low light may result in other artefacts such as unnatural bluish tones in an image of the face due to the cool colour of the light emitted from the sender's display.

Figure 4:
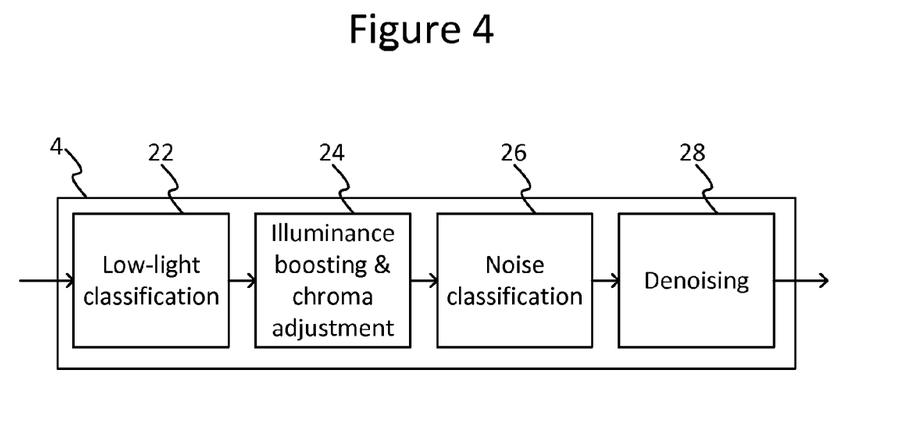
FIG. 4 is a schematic block diagram of a low-light enhancement module.

The following provides an example of a very low-complexity pre-processing module 4 for enhancing video captured in low-light conditions according to embodiments of the present disclosure. Sub-modules of illumination boosting, chroma adjustment, and denoising are controlled based on a (soft) classifier design as disclosed below. The disclosed classifiers comprise light and noise features determined from the captured video, a low-light classification defining a low light condition, and a noise classification defining a noise condition. For example, the noise feature may be composed of a combination of noise measured in the (e.g. blue) chroma channel and (weighted) contrast measured in the luminance channel. The light-level feature may be composed of a combination of noise measured in the (e.g. blue) chroma channel and (weighted) contrast measured in the luminance channel. These classifiers are designed as one-dimensional to achieve low-complexity. They are then used to define a soft low-light classification used to control luminance boosting and chrominance adjustment, and/or soft noise classification used to control de-noising.

FIG. 4 provides a block diagram showing the processing chain for a low-light video enhancer module 4 according to embodiments of the present disclosure 2. The different analysis and processing blocks are described in more detail below, starting with the low-light and noise classifiers.

As shown schematically in FIG. 4, the low-light enhancer comprises a low-light classification module 22 arranged to receive the captured video signal from the camera, a luminance boosting & chrominance adjustment module 24 having an input coupled to the output of the low-light classification module 22, a noise classification module 26 having an input coupled to the output of the illuminance boosting & chrominance adjustment module 24, and a de-noising module 28 having an input coupled to the output of the noise classification module 26. The output of the de-noising module 28 is arranged to provide the pre-processed version of the video signal following each of these stages on to the encoder 6 for encoding.

The low-light classification module 22 is configured to detect a low-light condition from the captured data of the video signal itself, rather than necessarily relying on a separate light level sensor. The low-light condition may comprise a classification as to whether the current frame (or frames or part of a frame) being pre-processed is considered to have been captured in low-light surroundings, e.g. a level below which the lack of light becomes a substantive cause of noise and/or other artefacts, and/or a level below which the camera's image sensor is not able to function properly or was not designed to function. Given that the pre-processing can never "know" for certain whether the data apparently captured was actually due to low-light distortion or whether it was really a legitimate part of the external scene being captured, then in embodiments the detection of the low-light condition comprises determining a probability of the video signal being captured in low light, i.e. a "soft" decision.

To detect such a low light condition, the low-light classification module 22 may be configured to determine both a measure of a light feature from the captured video signal, and also a measure of a noise feature from the captured video signal. It then detects a low-light condition based on a combination of the light and noise features.

In embodiments, the light feature may comprise a measure of contrast over the current frame being considered, or over a part of the frame, or even over a few frames. The measure of the contrast may comprise a measure of standard deviation in the luminance channel. The noise feature may be measured based on differences between adjacent or nearby samples. The "adjacent" samples may be of an undersampled set.

The light and noise features define a two-dimensional light-noise space. In embodiments, to reduce complexity of the computation, the combination of the light and noise features may comprises a rotation in the light-noise space to produce a one-dimensional light-level metric taking into account both light and noise, and the low-light condition may be determined based on a measure of the one-dimensional light-level metric.

The rotation may be performed by a linear combination of the light feature and noise feature: $q_{light}=k_1 \cdot v_{noise}+k_2 \cdot v_{light}$, where $q_{light}$ is the one-dimensional light-level metric, $v_{noise}$ is the noise feature, $v_{light}$ is the light feature, and $k_1$ and $k_2$ are constants. In one implementation, $k_1=-0.4$ and $k_2=+0.9$ to one significant figure.

Similarly, the de-noising may be performed in response to a noise condition being a different condition than the low-light condition, but also being based on a combination of the light and noise features. This combination may also comprise performing a rotation in the light-noise space to produce a one-dimensional noise metric taking into account both light and noise, such as a linear combination $q_{noise}=k_1 \cdot v_{noise}+k_2 \cdot v_{light}$, where $q_{noise}$ is the one dimensional noise metric, and $k_1$ and $k_2$ are constants. In one implementation, $k_1=-0.9$ and $k_2=+0.3$ to one significant figure. Further, based on this metric, the noise condition may also be determined in terms of a probability of "soft" determination based on such a noise feature, analogous to the detection of the low-light condition.

A more detailed, exemplary implementation of the light and noise classification performed by the modules 22 and 26 is set out below.

From each captured video frame, two features are extracted, one noise feature extracted from the blue chroma channel and one light feature extracted from the luma channel. The noise feature can be extracted from any channel, but the choice of the blue channel here is motivated by the higher amount of noise or distortion that has been found to occur in this channel for many cameras evaluated in low light. Let U(x,y) denote the blue chroma channel (e.g. in a YUV420p color space). The noise feature may be defined as the average thresholded absolute difference between horizontally adjacent blue chroma pixels, which may be determined as:

$$v_{noise} = \frac{1}{|\Omega y||\Omega x|} \sum_{y \in \Omega y} \sum_{x \in \Omega x} |U(x, y) - U(x+1, y)| \theta(x, y),$$

where $|\Omega y|$ and $|\Omega x|$ define the cardinality of the set of vertical and horizontal pixels used in the averaging and where:

$$\theta(x, y) = \begin{cases} 1 & \text{if } |U(x, y) - U(x+1, y)| \leq K \\ 0 & \text{otherwise} \end{cases}$$

where K is a constant dependent on the resolution of the video image being encoded. For example K may equal 5, or 4 if the spatial width of the video image is less than 200 pixels (assuming a landscape view).

To reduce computational complexity, |U(x,y)−U(x+1, y)| may be under sampled, e.g. computed for every fifth pixel horizontally and vertically. I.e. the "adjacent" samples may be of an undersampled set. The threshold function is introduced to distinguish between noise and texture. A slightly smaller threshold may be applied for low-resolution frames to make the feature more resolution independent.

The second feature, the light feature, may be defined as the product between the standard deviation and the mean of luma which may be determined by:

$$v_{light} = \frac{\sigma_y m_y}{100}.$$

The standard deviation of the luma intensities is a measure of the global contrast of the image. Low-contrast images are often a consequence of poor illumination. The weighting with the mean luma intensity is introduced to capture the all dark versus all bright case. Similar to the noise feature, the standard deviation and the mean are calculated based on under sampled data, e.g. using only every fifth pixel horizontally and vertically (i.e., downsampling by a factor of 25).

Figure 5:
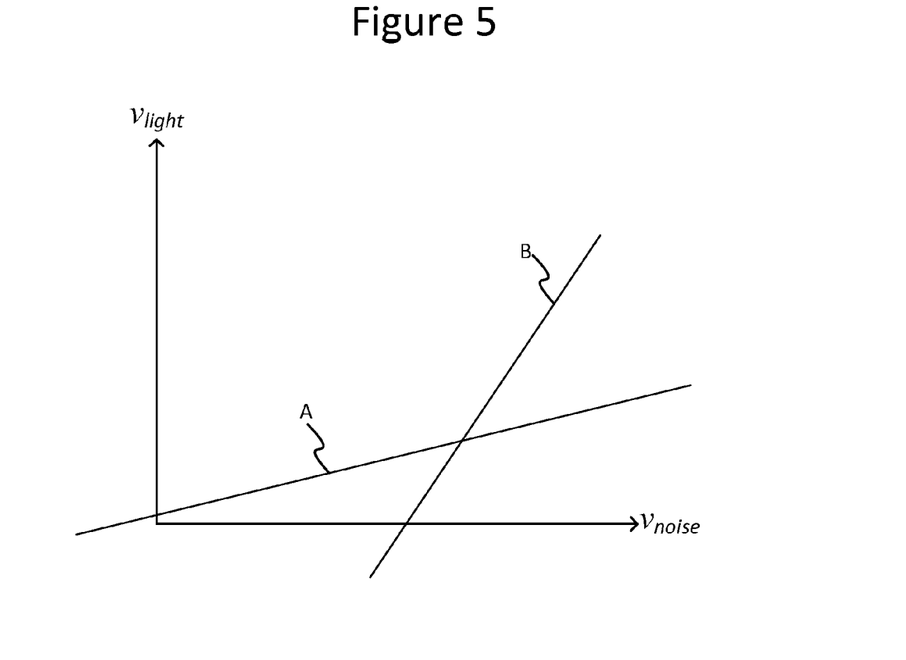
FIG. 5 is a schematic sketch of a light-noise feature space.

By analyzing a set of features extracted from a large range of videos, it has been found that the low-light and the noise regions can be approximately defined by diagonal lines in the feature space. This is illustrated in FIG. 5. The region below the line labeled A is defined as the low-light region and the region below the line labeled B is defined as the noisy region. The diagonal decision regions are exploited to facilitate dimensionality reduction, by rotating the feature space such that the diagonal line coincides with the horizontal axis in the new feature space. This that only the transformed values along the vertical axis then have to be considered. In an exemplary implementation the transformed feature for the low-light classifier is defined as:

$q_{light}=-0.3939v_{noise}+0.9191v_{light}$, and the transformed feature for the noise as:

$q_{noise}=-0.9487v_{noise}+0.31631v_{light}$

The transformed feature sets are labeled or partitioned into low-light versus normal light and noisy versus clean. Manual labeling was found to be sometimes quite complicated and therefore instead, the transformed feature sets are labeled at least partially automatically using the concept shown in FIG. 5 for this example implementation.

Using a naïve Bayes' classifier with a single univariate Gaussian for each labeled feature set (e.g. the feature space of the normal light is defined by a single Gaussian with a mean $m_{normlight}$ and a variance $\sigma_{normlight}^2$) the conditional probability of low-light given the transformed light feature can be expressed as:

$$Pr(\text{lowlight}|\, q_{light}) = \cfrac{1}{1 + \cfrac{Pr(\text{normlight})\sigma_{lowlight}}{Pr(\text{lowlight})\sigma_{normlight}} \exp\left(\cfrac{\sigma_{normlight}^2(q_{light}-m_{lowlight})^2 - \sigma_{lowlight}^2(q_{light}-m_{normlight})^2}{\sigma_{lowlight}^2\sigma_{normlight}^2}\right)}$$

where Pr(normlight)=1−Pr(lowlight), Pr(normlight) denotes the a-priori probability of normal light and Pr(lowlight) denotes the a-priori probability of low-light. In an analogous fashion, the probability of a video frame being noisy given the transformed noise feature may be defined as:

$$Pr(\text{noisy}|\, q_{noise}) = \cfrac{1}{1 + \cfrac{Pr(\text{clean})\sigma_{noisy}}{Pr(\text{noisy})\sigma_{clean}} \exp\left(\cfrac{\sigma_{clean}^2(q_{noise}-m_{noisy})^2 - \sigma_{noisy}^2(q_{noise}-m_{clean})^2}{\sigma_{clean}^2\sigma_{noisy}^2}\right)}$$

where Pr(clean)=1−Pr(noisy), Pr(noisy) denotes a probability of noise due to low-light, and Pr(clean) denotes a probability of noise not being experienced due to low light.

The per-frame computed low-light/noise probabilities may then be smoothed using an exponential moving average, before being compared against a classification threshold.

Turning to the illuminance boosting and choma adjustment performed by the module 24, the illuminance boosting is applied in response to the detection of the low-light condition. For example the probability may be compared to a threshold to make a "yes/no" decision as to whether the frame will have its luminance channel boosted (if the probability is high enough the boosting is applied). Alternatively the boosting may be made a matter of degree based on the level of probability, e.g. based on a look up table or calculated as a function of the probability of low light. In embodiments, the chrominance adjustment may be performed in response to detecting said same low-light condition based upon which the luminance is boosted. For example to reduce the impact of blue artefacts, the chrominance adjustment may comprise warming a colour temperature of the video signal. E.g. where the chrominance channels comprise a red channel and a blue channel, as in YUV space, the warming of the colour temperature may be performed by augmenting the red channel and diminishing the blue channel. The warming of the colour temperature may be performed by adding an offset to the red channel and subtracting an offset from the blue channel. Alternatively other functions such as multiplicative adjustment could be applied, or a look-up could be used. The chrominance adjustment may be applied on a "yes/no" basis in dependence on whether the probability is beyond the threshold for detecting low light (applied if the probability is high enough), or could be made a matter of degree based on the probability (e.g. a calculated function of probability or determined look-up, so that a high probability means greater adjustment).

A more detailed, exemplary implementation of the luminance boosting and chroma adjustment performed by the module 24 is set out below.

Figure 6:
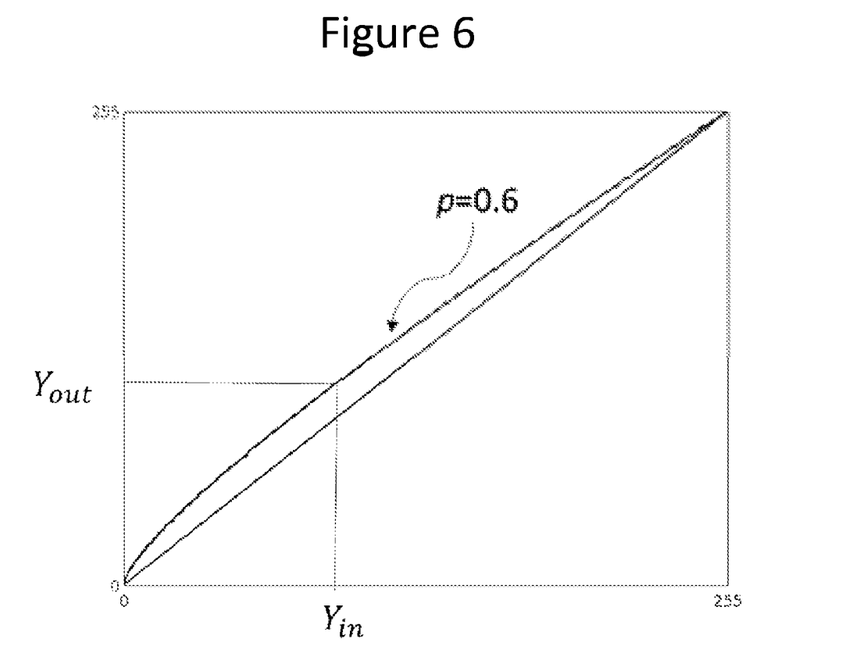
FIG. 6 is a schematic sketch of a luma boosting function.

A common issue with video captured in low-light is that the scene is dark and often containing shadows in the facial region. Not being able to clearly see eyes and facial expressions potentially degrades the quality of the communication. The illumination boosting block in the following algorithm is an intensity transformation of the form shown in FIG. 6. The transformation is a gamma-like function and can for instance be determined by:

$$Y_{out}(x, y) = \text{Round}\left(c_1\left(\frac{Y_{in}(x, y)}{c_2}\right)^p + c_3 Y_{in}(x, y)\right),$$

where p controls the aggressiveness of the illuminance boost, where $Y_{in}(x,y)$, $Y_{out}(x,y)$ denote the input and output luma pixel intensities respectively, and $c_1$, $c_2$ and $c_3$ are constants. "Round" represents rounding operation rounding to the nearest one of the discrete levels that the luma channel Y can take, e.g. one of the 256 possible Y levels (0-255) for an 8-bit Y channel. A suggested range for the parameter p is between 0.6 and 1 (where 0.6 corresponds to the most aggressive illumination boost). Example values for $c_1$, $c_2$ and $c_3$ are $c_1$=102, $c_2$=255 and $c_3$=3/5. The effect of the transformation is that details in the low-intensity regions become more visible. This is shown in FIG. 6.

For example, p may be set to a fixed value and the boosting either applied or not applied in dependence on whether the low-light probability is beyond a threshold (if the probability is high enough the boosting is applied). Alternatively p may be varied as a matter of degree based on the determined probability (higher probability being arranged to cause a higher p value).

For the chroma adjustment, a small negative offset may be applied to the blue chroma pixel values, U(x,y), and a small positive offset to the red chroma pixel values, V(x,y), in order to increase the color temperature (away from a bluish tone). The offset may be applied on a yes/no basis depending on whether the probability of low light is beyond a threshold (if the probability is high enough the adjustment is applied), or the size of the offset may be adapted with the strength of the illumination boosting (higher probability being arranged to cause a higher offset).

With regard to the de-noising performed by the module 28, this can have a number of related effects. As mentioned, the noise experienced on the chroma or colour channel(s) introduces greater differences within a frame or between frames which in turns increases the number of bits spent on the chroma channel(s). The de-noising is applied to reduce the visible artefacts caused by the noise, but also to reduce the number of bits incurred by this noise. Further, this has the effect of making more bits available for encoding the luminance channel. As mentioned, the bitrate controller 21 allocates a certain bit budget for the encoding, and adapts the encoding to attempt to spend as many bits of the budget as possible without exceeding this budgetary constraint. Thus if fewer bits are incurred on one or both of the chroma channels, the bitrate controller 21 will automatically reallocate the "freed" bits of the bit budget to the remaining channel(s)—including at least the luminance channel.

In embodiments it would also be desirable to keep the complexity of the de-noising to a manageable level. A detailed example of a de-noising operation with reduced complexity is set out in the following.

Given tough complexity targets, prior methods for denoising such as the patch/block based denoising method of BM3D (block matching and 3D filtering) may not necessarily be the most desirable implementation. Instead the de-noiser 28 may resort to more basic filtering techniques. An approach found to provide a compromise between computational complexity and denoising performance is a recursively implemented box-blur applied to the chroma channels.

When implementing a box filter, it may be desirable to take advantage of the fact the filter kernel is uniform (i.e., all pixels within the box are weighted equally in the averaging). The fastest algorithm found is based on recursive updates of the filter kernel. The algorithm is as follows: Let C(x−w, y) be the sum of e.g. blue chroma pixels (i.e., the U-channel) in the column within the filter kernel at horizontal position x−w (kernel width is 2w+1) and vertical position y (the center position of the kernel is (x,y)), i.e.:

$$C(x-w, y) = \sum_{y'=y-w}^{y+w} U(x-w, y').$$

In the initialization phase the array C is computed for the first horizontal row (ignoring border processing here). The filtered pixel at position (x,y) is obtained by summing all columns from C (x−w, y) to C (x+w, y) and normalizing with the box area. Let S(x,y) denote this sum, i.e.:

$$s(x, y) = \sum_{x'=x-w}^{x+w} C(x', y).$$

To filter the next pixel, the complete summation over the summed columns C does not necessarily have to be computed. Instead, only the left most summed column may be subtracted, and the new column added, i.e.:

$$S(x+1,y)=S(x,y)+C((x+1)+w,y)-C(x-w,y).$$

When a row is processed, a recursive update of the summed columns can be performed to obtain the summed columns for the next row, i.e.:

$$C(x,y+1)=C(x,y)+U(x,y+w+1)-U(x,y-w).$$

This way essentially only two additions and two subtractions have to be incurred per pixel to perform the filtering. In embodiments, the same processing may be performed on both chroma channels, or only one such as the blue channel.

In embodiments, the de-noising may be applied on a yes/no basis depending on whether the noise condition is detected, e.g. depending on whether the noise probability passes a threshold (if the probability is high enough, the de-noising is applied). Alternatively one or more parameters of the de-noising filter may be varied as a matter of degree in dependence on the probability.

It will be appreciated that the above embodiments have been described only by way of example.

For instance, while the above has been described in terms of a de-noising operation to reduce the number of bits incurred by a noisy colour channel, an alternative would be to increase the quantization step-size in the colour channel(s) (compared to the achromatic channel). That is, the de-noising module 28 may be replaced (or supplemented) by a noise dependent quantization step-size on the colour channel(s), which reduces the number of bits on the colour channel(s) by applying a coarser quantization granularity than when the frame is not classified as containing disturbance due to low light (and coarser than the achromatic channel). This will have a similar effect to de-noising (though it may not achieve the same smoothing effect and may not alleviate splotches to the same extent, which is why box-filtering was used in the embodiments above). Another alternative would be just to supress one or both of the colour channels without changing the quantization steps (e.g. reduce the magnitude of the samples by a certain factor or subtract a certain offset) on the basis that the data on the colour channel(s) is less useful or lower quality. That is, one may sacrifice colour for a greater subjective quality image that is greyer or more monochrome.

Note also that the low-light enhancement does not necessarily have to be implemented in a pre-processing stage, and instead one or more of the low-light enhancement operations may be implemented as an integral part of the encoder 6. For example, in the case where the operation applied to the colour channel(s) comprises an increase in quantization step size (decrease in granularity), this may be implemented in the encoder 6 rather than a pre-processing stage.

Further, although the above has been described in terms of the freed bits being reallocated by a bitrate controller, it is possible that other effects result in such bits being spent on the luminance or achromatic channel. For example, generally the luma boost described above does not necessarily incur more bits on the luma channel since it is typically the motion prediction residual that is being transformed, quantized and encoded. However (assuming the residual is a subtractive difference) if the boost gives a $Y_{out}$ vs. $Y_{in}$ curve that is steeper than just a gradient 1 straight line (i.e. steeper than just $Y_{out}=Y_{in}$+a fixed offset), then this may tend to result in a larger residual for low luminance samples. I.e. larger values are increased by a greater offset than smaller values, resulting in a greater subtractive difference. In the $Y_{out}$ vs. $Y_{in}$ curve of FIG. 6 the curve is steeper at the bottom end and shallower at the top end, so in general the residual could be greater or smaller. However, in very low light capture, the samples tend to fall toward the bottom end of this curve and therefore incur a greater residual due to the boost. Thus at the very lowest intensity range the energy of a prediction residual would be increased when boosting is applied prior to encoding, albeit this is not valid for the entire intensity range. Any increase in luma bits that is caused by such a boost, if any, can be compensated for by the de-noising on the choma channel(s), and/or any bits of the budget still left over may be reallocated by the bitrate controller. Other luminance boosts could also be applied, for example a luminance boosting operation could be implemented which is explicitly designed to increase the number of bits spent on the luma channel.

Further, the teachings of the various enhancement stages disclosed above do not necessarily all have to be applied together. E.g. the above discloses two different chrominance operations both in some way based on light: a chrominance adjustment that is performed in response to the same low-light condition as the luminance boosting, and a de-noising operation on a chrominance channel that is performed in response to a separate noise condition, but which noise condition takes into account the luminance across a frame.

In alternative embodiments, it would be possible to achieve some of the enhancement effect by just applying the chrominance adjustment without the de-noising, or just applying the de-noising without the chrominance adjustment, and/or either of these could be applied with or without the luminance boosting. Further, different conditions could be used to trigger or vary the degree of such operations and/or the luminance boosting. Further, the luminance boosting could be applied independently of one or both of the chrominance adjustment and de-noising.

Hence according to another aspect of the invention, there may be provided an apparatus comprising an encoder arranged to encode a video signal captured from a camera; and a low-light enhancement module being configured to perform a low-light enhancement on the video signal in a colour space comprising two colour channels representing colour and an achromatic channel representing light level, the low-light enhancement comprising: determining a measure of a light feature from the captured video signal, and a measure of a noise feature from the captured video signal, wherein the light and noise features define a two-dimensional light-noise space; performing a rotation in the light-noise space to produce a one-dimensional metric taking into account both light and noise; and applying low-light processing to one or more of said channels based on the one-dimensional metric.

For example the low-light enhancement may comprise determining a soft classifier based on the one-dimensional metric, representing a probability of the video being captured in low light or containing disturbance due to low light, and the low-light processing may be applied based on the soft classifier. The low-light processing may comprise boosting the achromatic channel, de-noising one or both colour channels, or a chrominance adjustment applied to one or both colour channels. In embodiments to different rotations in the light-noise space may be performed, to produce two different on-dimensional metrics. In embodiments these may be used to determine two different soft classifiers respectively, one representing a probability of capture in low light and one representing probability of noise due to low light. The boost on the achromatic channel and/or the chromatic adjustment may be based on the former, and/or the de-noising may be based on the latter.

In further embodiments the low-light processing can be applied in response to detecting other classifications of low-light and/or noise. For example, although the above has been described in terms of a low-light condition being detected directly from that captured data, another possibility would be to use a separate light sensor to gauge the actual light level in the camera's environment. In another embodiment, a condition may be based on a combination of captured data and separate light sensor.

Further, note that any teachings herein made in relation to luma may be extended to gamma corrected or uncorrected luminance channel or other channel representing overall achromatic light level; and any references herein to chroma or chrominance may extend to any system of colour channels used in conjunction with such an achromatic light channel. The teachings herein are not specific to any one particular colour space. For example, the pre-processing could be applied in HSV or HSL space.

Further, although the above has been described in terms of capture, low-light enhancement encoding and transmission all being performed at a single user terminal, in alternative scenarios one or more of these could be implemented at another type of terminal such as a server, and these stages are not necessarily performed at the same terminal. For example one user terminal could submit a raw captured video to a server or other storage device, and another user terminal could retrieve the video and then pre-process and encode it for transmission elsewhere. Another example would be a transcoding operation applied at an intermediate network element such as a server: one user terminal may transmit a video encoded according to one codec via a server, and the server may decode, apply the low-light enhancement and re-encode according to the same or a different codec for transmission to another user terminal. Further, the teachings are not limited to transmitting to another, receiving user terminal over network or communication medium: instead the encoding may be performed in order to store the video on a storage medium for later playback at that same user terminal.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the terminal may also include an entity (e.g. software) that causes hardware of the terminals to perform operations, e.g., processors functional blocks, and so on. For example, the terminal may include a computer-readable medium that may be configured to maintain instructions that cause the terminal, and more particularly the operating system and associated hardware of the terminal to perform operations. Thus, the instructions function to configure the operating system and associated hardware to perform the operations and in this way result in transformation of the operating system and associated hardware to perform functions. The instructions may be provided by the computer-readable medium to the terminal through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc such as a CD or DVD, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus comprising:
   at least a memory and a processor to implement an encoder and a low-light enhancement module;
   the encoder configured to encode a video signal captured from a camera; and the low-light enhancement module configured to perform a low-light enhancement on the video signal in a colour space comprising two colour channels representing colour and an achromatic channel representing light level, the low-light enhancement comprising:
- determining a measure of light feature and a measure of noise feature from the captured video signal;
- detecting at least a first classification indicative of disturbance in the video signal due to capture in low light, the first classification being a noise classification based on a combination of the measure of light feature and the measure of noise feature, the measure of light and noise features defining a two-dimensional light-noise space, and the combination comprising performing a rotation in the light-noise space to produce a one-dimensional noise metric taking into account both light and noise; and
- in response to detecting said first classification, applying a first low-light processing to at least one of the colour channels to reduce a number of bits incurred by colour when encoded by the encoder, such that an increased number of bits is spent on the achromatic channel when encoded by the encoder, the first low-light processing comprising de-noising a single one of the colour channels.

2. The apparatus of claim 1, wherein the first low-light processing further comprises increasing quantization coarseness on the at least one colour channel.

3. The apparatus of claim 1, wherein the rotation is determined by performing a linear combination:

$$q_{noise} = K_1 \cdot v_{noise} + K_2 \cdot v_{light},$$

where $v_{light}$ is the light feature, $v_{noise}$ is the noise feature, $q_{noise}$ is the noise metric, and $K_1$ and $K_2$ are constants.

4. The apparatus of claim 3, wherein $K_1 = -0.9$ and $K_2 = +0.3$ to one significant figure.

5. The apparatus of claim 1, wherein the noise feature is determined as an average thresholded absolute difference between adjacent pixels on said one of the colour channels, and wherein the pixels are undersampled.

6. The apparatus of claim 5, wherein the noise feature is determined according to:

$$v_{noise} = \frac{1}{|\Omega y||\Omega x|} \sum_{y \in \Omega y} \sum_{x \in \Omega x} |U(x, y) - U(x+1, y)| \theta(x, y),$$

where $v_{noise}$ is the noise feature, U is the blue chrominance channel at horizontal and vertical pixels (x,y) of a frame of the video signal which is under sampled, $|\Omega y|$ and $|\Omega x|$ define a cardinality of the vertical and horizontal pixels (x,y) respectively, and:

$$\theta(x, y) = \begin{cases} 1 & \text{if } |U(x, y) - U(x+1, y)| \leq K \\ 0 & \text{otherwise} \end{cases}$$

where K is a constant dependent on a resolution of the video signal.

7. The apparatus of claim 1, wherein the light feature comprises a measure of contrast determined from the achromatic channel.

8. The apparatus of claim 1, wherein the noise classification is a soft classification representing a probability of noise on the at least one colour channel due to capture in low light.

9. The apparatus of claim 8, wherein the probability of noise due to low light is based at least in part on values for Pr(noisy) and Pr(clean), where Pr(clean)=1−Pr(noisy), Pr(noisy) denotes a probability of noise due to low-light, and Pr(clean) denotes a probability of noise not being experienced due to low light.

10. The apparatus of claim 1, wherein the low-light enhancement further comprises: detecting a second classification indicative of the video signal being captured in low light, the second classification being a low-light classification based on a second combination of the light and noise features different than the first combination; and performing further low-light processing in response to detecting the second classification.

11. The apparatus of claim 10, wherein the light and noise features define a two-dimensional light-noise space, and said second combination comprises performing a rotation in the light-noise space to produce a one-dimensional light-level metric taking into account both light and noise, said low-light classification being based on a measure of the one-dimensional light-level metric.

12. The apparatus of claim 11, wherein the rotation is determined by performing a linear combination:

$$q_{light} = k_1 \cdot v_{noise} + k_2 \cdot v_{light},$$

where $q_{light}$ is the one-dimensional light-level metric, $v_{noise}$ is the noise feature, $v_{light}$ is the light feature, and $k_1$ and $k_2$ are constants.

13. The apparatus of claim 12, wherein $k_1 = -0.4$ and $k_2 = +0.9$ to one significant figure.

14. The apparatus of claim 10, wherein the low-light classification is a soft classification representing a probability of the video signal being captured in low light.

15. The apparatus of claim 14, wherein the probability of the video being captured in low light is based at least in part on values for Pr(normlight) and Pr(lowlight), where Pr(normlight)=1−Pr(lowlight), Pr(normlight) denotes a probability of normal light and Pr(lowlight) denotes a probability of low-light.

16. The apparatus of claim 10, wherein one or both of:
- the further low-light processing comprises a boosting of the achromatic channel; and/or
- the colour channels comprise a red channel and a blue channel, and the further low-light processing comprises a chrominance adjustment comprising augmenting the red channel and/or diminishing the blue channel.

17. The apparatus of claim 1, wherein the first low-light processing comprises de-noising a single one of the colour channels without de-noising any other colour channels.

18. A method comprising:
- receiving a video signal captured from a camera;
- pre-processing the video signal in a colour space comprising a red chrominance channel, a blue chrominance channel and a gamma corrected or uncorrected luminance channel; and
- encoding the video signal following the pre-processing;
- wherein the pre-processing comprises a low-light enhancement being performed by:
  - determining a measure of a light feature from the captured video signal, and a measure of a noise feature from the captured video signal, wherein the light and noise features define a two-dimensional light-noise space;
  - performing a first rotation in the light-noise space to produce a one-dimensional noise metric taking into account both light and noise;

based on the one-dimensional noise metric, determining a first soft classification representing a probability of noise on the at least one chrominance channel due to capture in low-light;

in dependence on the first soft classification, de-noising the at least one of the chrominance channels;

performing a second rotation in the light-noise space to produce a one-dimensional light-level metric taking into account both light and noise;

based on the one-dimensional light-level metric, determining a second soft classification representing a probability of the video signal being captured in low-light;

in dependence on the second soft classification, performing a chrominance adjustment to augment the red chrominance channel and diminish the blue chrominance channel; and in dependence on the second soft classification, boosting the luminance channel.

19. A computer-readable storage medium comprising instructions thereon that, responsive to execution by a processor, perform operations comprising:

receiving a video signal captured from a camera;

performing a low-light enhancement on the video signal in a colour space comprising two colour channels representing colour and an achromatic channel representing light level; and encoding the video signal;

wherein the low-light enhancement comprises:

determining a measure of light feature and a measure of noise feature from the captured video signal;

detecting a first classification indicative of disturbance in the video signal being due to capture in low light, the first classification being a noise classification based on a combination of the measure of light feature and the measure of noise feature, the measure of light and noise features defining a two-dimensional light-noise space, and the combination comprising performing a rotation in the light-noise space to produce a one-dimensional noise metric taking into account both light and noise; and in response to detecting said first classification, applying a first low-light processing to at least one of the colour channels to reduce a number of bits incurred by colour when encoded, such that an increase number of bits is spent on encoding the achromatic channel when encoded, the first low-light processing comprising de-noising a single one of the colour channels.

20. The computer-readable storage medium of claim 18, wherein the first low-light processing comprises de-noising a single one of the colour channels without de-noising any other colour channels.

* * * * *